(12) United States Patent
Choi et al.

(10) Patent No.: US 9,802,176 B2
(45) Date of Patent: Oct. 31, 2017

(54) METHOD FOR MIXING IN A HYDROCARBON CONVERSION PROCESS

(71) Applicant: Saudi Arabian Oil Company, Dhahran (SA)

(72) Inventors: Ki-Hyouk Choi, Dhahran (SA); Mohammad S. Garhoush, Dammam (SA); Bader M. Alotaibi, Dammam (SA); Mohammad A. Alabdullah, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 288 days.

(21) Appl. No.: 14/666,362

(22) Filed: Mar. 24, 2015

(65) Prior Publication Data
US 2016/0279594 A1    Sep. 29, 2016

(51) Int. Cl.
*B01J 19/24* (2006.01)
*C10G 9/34* (2006.01)
(Continued)

(52) U.S. Cl.
CPC .............. *B01J 19/24* (2013.01); *B01F 3/0865* (2013.01); *B01F 5/0478* (2013.01);
(Continued)

(58) Field of Classification Search
CPC ................... B01J 19/24; B01J 2219/24; B01J 2219/00123; B01F 5/0478; B01F 3/0865;
(Continued)

(56) References Cited

U.S. PATENT DOCUMENTS

| | | |
|---|---|---|
| 3,948,754 A | 4/1976 | McCollum et al. |
| 4,818,370 A | 4/1989 | Gregoli et al. |

(Continued)

FOREIGN PATENT DOCUMENTS

WO    2012003578 A1    1/2012

OTHER PUBLICATIONS

International Search Report and Written Opinion for related PCT application PCT/US2016/023990 dated Jul. 4, 2016.
(Continued)

*Primary Examiner* — Randy Boyer
*Assistant Examiner* — Juan Valencia
(74) *Attorney, Agent, or Firm* — Bracewell LLP; Constance Gall Rhebergen

(57) ABSTRACT

A sequential mixer for mixing a heated hydrocarbon stream and a supercritical fluid to produce an intimately mixed stream upstream of a supercritical reactor. The sequential mixer comprising a body having a body length and a body diameter; a hydrocarbon inlet physically connected to the body, having an inlet diameter, the heated hydrocarbon stream is introduced through the hydrocarbon inlet; a mixed stream outlet physically connected to the body and fluidly connected to the supercritical reactor, having an outlet diameter; a traversing axis extending through the center of the body from the hydrocarbon inlet to the mixed stream outlet; and a plurality of fluid ports physically connected to the body, the plurality of fluid ports are arranged in a port alignment arrayed along the traversing axis, each fluid port has a port diameter and a port angle, the supercritical fluid is injected through the plurality of fluid ports.

19 Claims, 9 Drawing Sheets

(51) Int. Cl.
*B01F 15/02* (2006.01)
*B01F 5/04* (2006.01)
*B01F 3/08* (2006.01)
*C10G 31/08* (2006.01)
*B01F 3/00* (2006.01)

(52) U.S. Cl.
CPC ........ *B01F 5/0485* (2013.01); *B01F 15/0254* (2013.01); *C10G 9/34* (2013.01); *C10G 31/08* (2013.01); *B01F 2003/0064* (2013.01); *B01F 2015/0221* (2013.01); *B01F 2215/0088* (2013.01); *B01J 2219/00123* (2013.01); *B01J 2219/24* (2013.01); *C10G 2300/805* (2013.01)

(58) Field of Classification Search
CPC ................ B01F 5/0485; B01F 15/0254; B01F 2003/0064; B01F 2015/0221; B01F 2215/0088; C10G 31/08; C10G 9/34; C10G 2300/805
See application file for complete search history.

(56) References Cited

U.S. PATENT DOCUMENTS

| | | | |
|---|---|---|---|
| 4,840,725 A | 6/1989 | Paspek | |
| 5,759,385 A | 6/1998 | Aussillous et al. | |
| 6,471,937 B1 | 10/2002 | Anderson et al. | |
| 6,508,931 B1 | 1/2003 | Lin et al. | |
| 7,144,498 B2 | 12/2006 | McCall et al. | |
| 7,566,436 B2 | 7/2009 | Lester et al. | |
| 7,767,076 B2 | 8/2010 | Hokari et al. | |
| 7,922,895 B2 | 4/2011 | Banerjee | |
| 8,025,790 B2 | 9/2011 | Choi et al. | |
| 8,197,670 B2 | 6/2012 | Li et al. | |
| 2002/0134704 A1 | 9/2002 | Mitchell et al. | |
| 2006/0262642 A1* | 11/2006 | Park | B01F 5/0475 366/340 |
| 2007/0158266 A1 | 7/2007 | Shekunov et al. | |
| 2008/0099374 A1 | 5/2008 | He et al. | |
| 2011/0163011 A1 | 7/2011 | Yarbro | |
| 2012/0061291 A1* | 3/2012 | Choi | C10G 49/18 208/53 |
| 2012/0156783 A1 | 6/2012 | Kubiak et al. | |
| 2013/0206645 A1 | 8/2013 | Yarbro | |
| 2014/0187456 A1* | 7/2014 | Lamb | C10M 169/048 508/371 |
| 2014/0251871 A1* | 9/2014 | Choi | C10G 31/09 208/208 R |

OTHER PUBLICATIONS

Chementator, Supercritical Water Cracks Residue Oil, Chemical Engineering, Sep. 2007.
Misch, Barbara et al., An Alternative Method of Oxidizing Aqueous Waste in Supercritical Water: Oxygen Supply by Means of Electrolysis, 17 Supercritical Fluids 227 (2000).
Phenix, Brian D. et. al., "The Effects of Mixing and Oxidant Choice on Laboratory-Scale Measurements of Supercritical Water Oxidation Kinetics", ind. Eng. Chem. Res., 41, pp. 624-631 (2002).

* cited by examiner

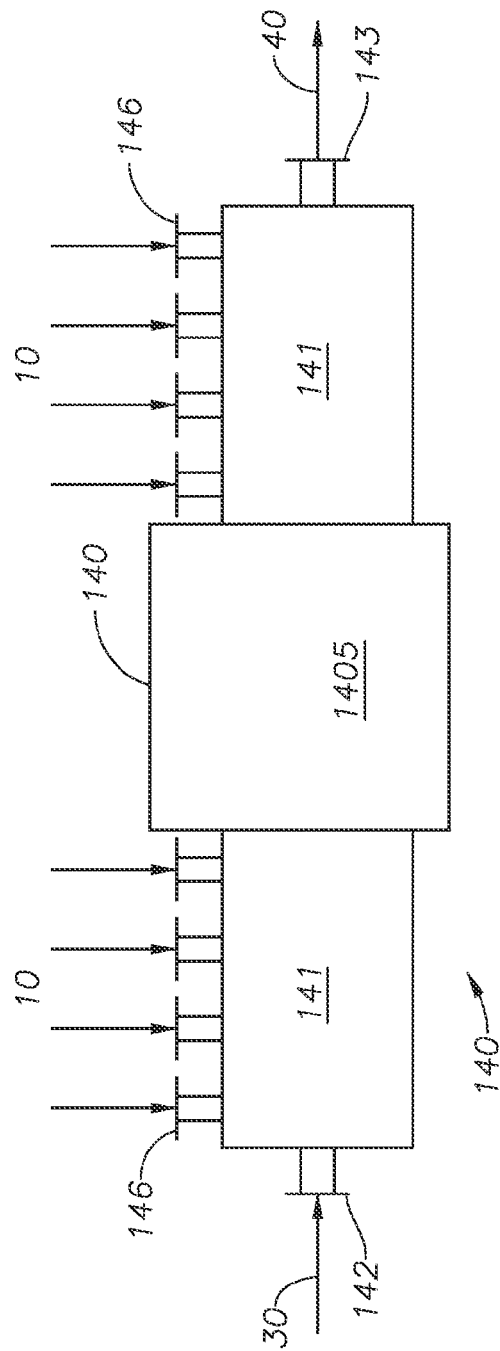
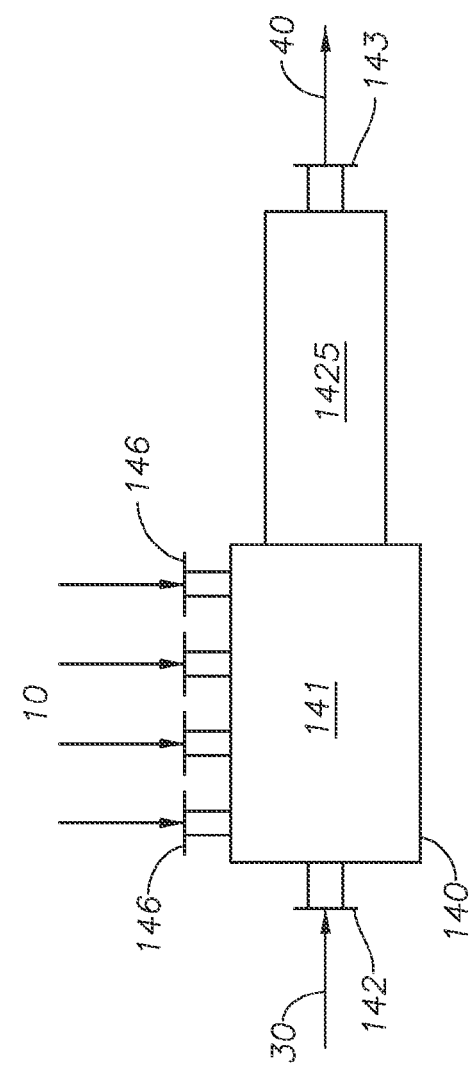

METHOD FOR MIXING IN A HYDROCARBON CONVERSION PROCESS

FIELD OF THE INVENTION

This invention relates to an apparatus and methods for mixing. More specifically, the present invention relates to an apparatus and methods for mixing hydrocarbons and supercritical fluids upstream of supercritical reactors.

BACKGROUND OF THE INVENTION

The supercritical water reaction has proven effective in upgrading heavy oil in the absence of catalyst or hydrogen. Hydrocarbon conversion reactions are known to improve the quality of petroleum-based fuel such as gasoline and diesel.

Supercritical fluids, such as water, are effective in hydrocarbon conversion reactions. Supercritical fluids act as a solvent for the hydrocarbons, dissolving the hydrocarbons in the supercritical fluid. Supercritical fluids are necessary for if hydrocarbons are exposed to temperatures above the critical point of the supercritical fluid, without being mixed with the supercritical fluid, large hydrocarbon molecules tend to condense into larger molecules which are eventually transformed into insoluble solid coke. Supercritical fluid, as a solvent, can prevent such undesired reactions.

While any supercritical fluid that interacts with hydrocarbons can be used, water, due to its environmental benefits and abundance, is the most popular supercritical fluid used and tested in the industry. Supercritical water behaves like an organic solvent for hydrocarbons due to its low dielectric constant. In the hydrocarbon conversion reaction, supercritical water can be a diluent to disperse hydrocarbons.

One of the important steps in reacting hydrocarbons under a supercritical water is mixing the two fluids. The better the mixing, the more likely the formation of coke in the reactor is reduced. Segregated portions of hydrocarbons which are not dissolved in supercritical water can be easily transformed to solid coke in the reactor. Although it is not yet clearly understood, mixing between hydrocarbons and supercritical water occur in stages. First, light hydrocarbons diffuse into the supercritical water by evaporation and form a single phase. Supercritical water having light hydrocarbons dissolved has higher solubility toward hydrocarbons than neat supercritical water. Second, supercritical water begins to penetration into a portion of the large hydrocarbons which are not evaporated in the first stage. While this second stage tends to a uniform phase, it is possible that the phase is not entirely uniform, but includes tiny hydrocarbon droplets dispersed in the supercritical water. As used herein, "dispersed" means to separate uniformly or nearly uniformly throughout the liquid. In the next stage, the asphaltenic portion, which is difficult to dissolve in the supercritical water, is swollen by supercritical water. The swollen asphaltenic portion (the aggregated asphaltene) eventually pops, or breaks, to form small droplets of hydrocarbons which can then be mixed with the supercritical water.

The asphaltenic portion is the most difficult portion of hydrocarbons to mix with supercritical water. Mixing of hydrocarbon feedstock and, in particular, the asphaltenic portion with supercritical water has many unknown variables and is therefore hard to control. Asphaltene is stabilized in the hydrocarbon stream with the aid of other molecules such as resins, aromatics, and saturates. In particular, resins and aromatics act as surfactants that disperse asphaltene in the hydrocarbon matrix. Destruction of resins and aromatics prior to asphaltene conversion results in aggregation of asphaltene which contributes to coke formation. It is important to disperse asphaltene within the supercritical water as thoroughly as possible before entering the reactor, to prevent the intermolecular condensation reactions that will result in coke formation in the reactor. In addition to dispersing the asphaltene, the supercritical water dissolves the resins and aromatics. However, dissolving the resins and aromatics and dispersing the asphaltenes is a balancing act that must be carefully managed to prevent the aggregation of asphaltene. One way to manage the balancing act is to dissolve or extract the resins and aromatics stepwise while keeping asphaltene in well dispersed state.

In order to maximize the effect of supercritical fluid in hydrocarbon conversion reactions, hydrocarbon feedstock must be very well mixed with supercritical fluid before being subjected to reactor which is operated at high temperatures.

Current mixing units includes mixing tees and mechanical mixers, such as ultrasonic wave generators. A mixing tee is a piping unit that has two inlet ports, one outlet port, and an can include an optional port for a thermocouple. In the case of mixing a hydrocarbon and a supercritical fluid, one inlet port is for the hydrocarbon and one inlet port is for the supercritical fluid. While mixing tees provide a measure of mixing, the tee provides a limited interface between the two fluids, which can limit the extent of mixing. Ultrasonic wave generators use highly sophisticated equipment to achieve nearly "complete" mixing. However, the highly sophisticated equipment necessary to produce ultrasonic energy requires large amounts of energy and is subject to electrical failure. The surface of the ultrasonic wave generating equipment can be eroded by the high energy vibration. In addition, the high energy vibration can cause mechanical failures in parts of the process lines that are joined together.

Therefore, there is a need for a mixing unit to facilitate the efficient contacting of heavy oil with supercritical fluid, which does not result in large amounts of coke or substantial increases in operating costs.

SUMMARY

This invention relates to an apparatus and methods for mixing. More specifically, the present invention relates to an apparatus and methods for mixing hydrocarbons and supercritical fluids upstream of supercritical reactors.

In a first aspect of the present invention, a method for hydrocarbon conversion in a supercritical reactor of an intimately mixed stream produced by a sequential mixer upstream of the supercritical reactor is provided. The method includes the steps of introducing a heated hydrocarbon stream to a hydrocarbon inlet of the sequential mixer, the hydrocarbon inlet parallel to a traversing axis of the sequential mixer, wherein the heated hydrocarbon stream has a pressure greater than the critical pressure of water and a temperature between 30° C. and 150° C., injecting a supercritical fluid through a plurality of fluid ports of the sequential mixer, wherein the plurality of fluid ports are arranged in a port alignment arrayed along the traversing axis, wherein each fluid port of the plurality of fluid ports has a port volumetric flow rate, wherein the supercritical fluid has a pressure greater than the critical pressure of water and a temperature greater than the critical temperature of water, allowing the heated hydrocarbon stream and supercritical fluid to mix in the sequential mixer to produce an intimately mixed stream, wherein the volumetric ratio of supercritical fluid to hydrocarbons in an in-mixer stream increases as the in-mixer stream passes each of the fluid ports of the plurality of fluid ports and the in-mixer stream receives a further injection of supercritical fluid, wherein the intimately mixed stream includes hydrocarbons and supercritical fluid, wherein the intimately mixed stream has a mixed temperature, transferring the intimately mixed stream to a supercritical reactor, the supercritical reactor maintained at a pressure above the critical pressure of water and a temperature above the critical temperature of water, wherein the hydrocarbons in the intimately mixed stream undergo hydrocarbon conversion reactions in the supercritical reactor to produce an effluent stream, cooling the effluent stream in a product exchanger to produce a cooled effluent, the product exchanger configured to cool the effluent stream to a temperature below the critical temperature of water to produce the cooled effluent, depressurizing the cooled effluent in a pressure reducer to produce a product stream, the pressure reducer configured to reduce the pressure of the cooled effluent to a pressure below the critical pressure of water to produce the product stream, separating the product stream in a gas-liquid product separator to produce a vapor phase product and a liquid phase product, separating the liquid phase product in a liquid product separator to produce an upgraded hydrocarbon stream and a recovered fluid stream.

In certain embodiments of the present invention, the sequential mixer further includes a body, the body physically connected to the hydrocarbon inlet, the hydrocarbon inlet having an inlet diameter, a mixed stream outlet, the mixed stream outlet physically connected to the body, the mixed stream outlet having an outlet diameter, the traversing axis, the traversing axis extending through the center of the body from the hydrocarbon inlet to the mixed stream outlet, a cross-sectional axis, the cross-sectional axis perpendicular to the traversing axis, and the plurality of fluid ports, the plurality of fluid ports fluidly connected to the body, wherein each fluid port has a port diameter, each fluid port has a port angle. In certain embodiments of the present invention, the supercritical fluid is water. In certain embodiments of the present invention, the port alignment is selected from the group consisting of straight in-line, straight across, staggered across, spiral pattern and combinations thereof. In certain embodiments of the present invention, the port angle is between 1 deg. and 90 deg. In certain embodiments of the present invention, the sequential mixer further comprises a flow restrictor installed between each of the plurality of fluid ports. In certain embodiments of the present invention, the flow restrictor is an orifice place with an orifice. In certain embodiments of the present invention, the mixed temperature is between 150° C. and 400° C.

In a second aspect of the present invention, a sequential mixer for mixing a heated hydrocarbon stream and a supercritical fluid to produce an intimately mixed stream upstream of a supercritical reactor is provided. The sequential mixer includes a body, the body having a body length and a body diameter, a hydrocarbon inlet, the hydrocarbon inlet physically connected to the body, the hydrocarbon inlet having an inlet diameter, wherein the heated hydrocarbon stream is introduced to the sequential mixer through the hydrocarbon inlet, a mixed stream outlet, the mixed stream outlet physically connected to the body and fluidly connected to the supercritical reactor, the mixed stream outlet having an outlet diameter, a traversing axis, the traversing axis extending through the center of the body from the hydrocarbon inlet to the mixed stream outlet, a cross-sectional axis, the cross-sectional axis perpendicular to the traversing axis, and a plurality of fluid ports, the plurality of fluid ports physically connected to the body, wherein the plurality of fluid ports are arranged in a port alignment arrayed along the traversing axis, wherein each fluid port of the plurality of fluid ports has a port diameter, wherein each fluid port has a port angle, wherein the supercritical fluid is injected through the plurality of fluid ports.

In certain embodiments of the present invention, the port alignment is selected from the group consisting of straight in-line, straight across, staggered across, spiral pattern and combinations thereof. In certain embodiments of the present invention, the port angle is between 1 deg. and 90 deg. In certain embodiments of the present invention, the sequential mixer further comprises a flow restrictor installed between each of the plurality of fluid ports. In certain embodiments of the present invention, the flow restrictor is an orifice place with an orifice. In certain embodiments of the present invention, the mixed temperature is between 150° C. and 400° C. In certain embodiments of the present invention, the body diameter is greater than 0.1 inch. In certain embodiments of the present invention, the body length is greater than 0.5 inches. In certain embodiments of the present invention, the inlet diameter is larger than the port diameter. In certain embodiments of the present invention, a mixing chamber is positioned between two of the plurality of fluid ports.

In at third aspect of the present invention, a system for producing an upgraded hydrocarbon stream is provided. The system includes a sequential mixer, the sequential mixer configured to receive a heated hydrocarbon stream through a hydrocarbon inlet and configured to receive a supercritical fluid through a plurality of fluid ports to produce an intimately mixed stream, the intimately mixed stream comprising hydrocarbons and supercritical fluid, wherein the sequential mixer includes a body, the body having a body length and a body diameter, wherein the heated hydrocarbon stream and the supercritical fluid mix in the body to produce the intimately mixed stream, the hydrocarbon inlet physically connected to the body, the hydrocarbon inlet having an inlet diameter, a mixed stream outlet, the mixed stream outlet physically connected to the body and fluidly connected to the supercritical reactor, the mixed stream outlet having an outlet diameter, a traversing axis, the traversing axis extending through the center of the body from the hydrocarbon inlet to the mixed stream outlet, and a plurality of fluid ports, the plurality of fluid ports physically connected to the body, wherein the plurality of fluid ports are arranged in a port alignment arrayed along the traversing axis, wherein each fluid port of the plurality of fluid ports has a port diameter, wherein each fluid port has a port angle, wherein the supercritical fluid is injected through the plurality of fluid ports. The system further includes a supercritical reactor, the supercritical reactor fluidly connected to the sequential mixer, the supercritical reactor configured to produce an effluent stream, a product exchanger, the product exchanger fluidly connected to the supercritical reactor, the product exchanger configured to cool the effluent stream to a temperature below the critical temperature of water to produce a cooled effluent, a pressure reducer, the pressure reducer fluid connected to the product exchanger, the pressure reducer configured to reduce the pressure of the cooled effluent to a pressure below the critical pressure of water to produce a product stream, a gas-liquid product separator, the gas-liquid product separator fluidly connected to the pressure reducer, the gas-liquid product separator configured to separate the product stream to produce a vapor phase product and a liquid phase product, a liquid product separator, the liquid product separator fluid connected to the gas-liquid separator, the liquid product separator configured to produce the upgraded hydrocarbon stream and a recovered fluid stream, wherein the upgraded hydrocarbon stream.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

FIG. 8 provides a side plan view of an embodiment of the sequential mixer with a mixing chamber according to the present invention.

FIG. 9 provides a side plan view of an embodiment of the sequential mixer with a mixing chamber according to the present invention.

DETAILED DESCRIPTION OF THE INVENTION

Figure 1:
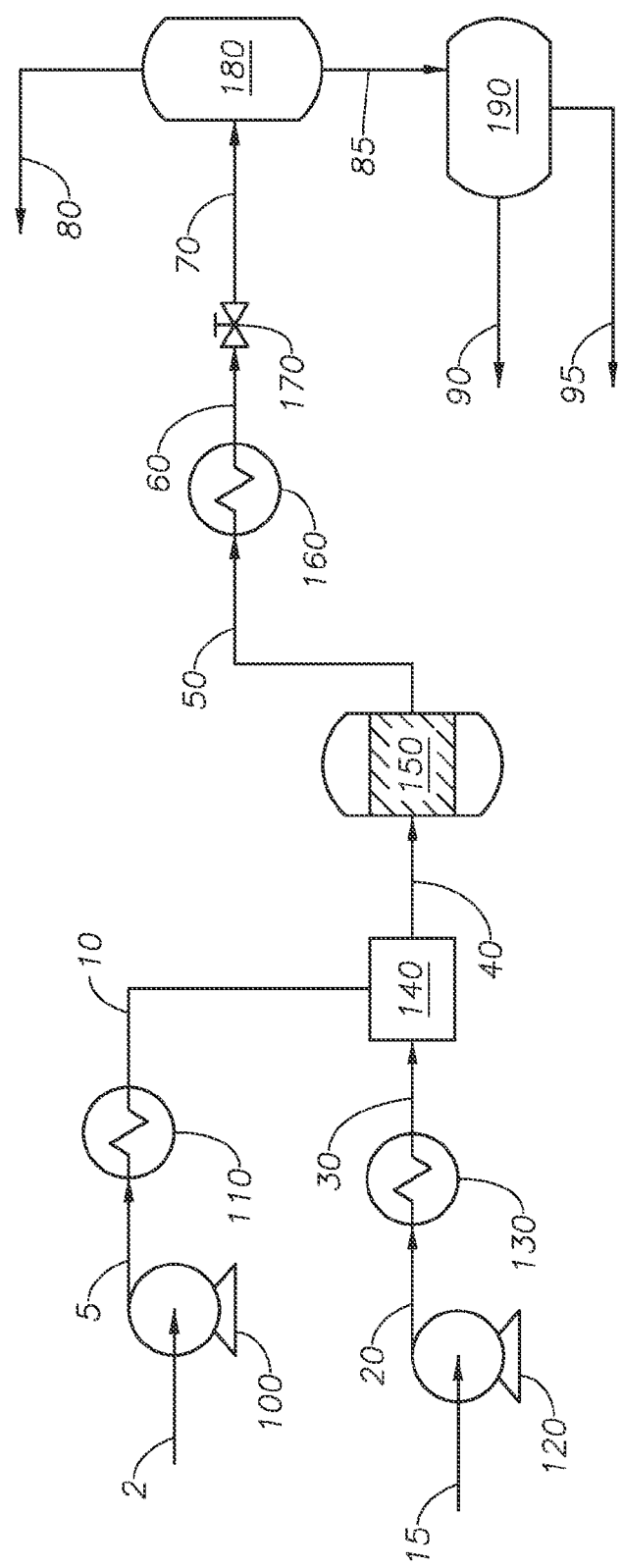
FIG. 1 provides a process diagram of one embodiment of the method of upgrading a hydrocarbon feedstock according to the present invention.

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, relating to the claimed invention.

The present invention provides an apparatus for sequential injection of a supercritical fluid into a hydrocarbon stream and methods for using the sequential mixer in a hydrocarbon upgrading process. To ensure mixing of the supercritical fluid and the hydrocarbons, the hydrocarbons and the supercritical fluid are mixed before subjecting the mixture to a reactor at supercritical reaction conditions. Ensuring mixing of the supercritical fluid and the hydrocarbons before the reactor is important because the reactor is at the same temperature or a higher temperature than the mixed stream and because the reactor has a longer residence time than the mixing unit. Thus, the hydrocarbons will begin reacting once they reach the reactor and will have sufficient time in the reactor to react. If the hydrocarbons are not well-mixed with the supercritical fluid before reaching the reactor, then the reactions in the reactor are likely to produce coke, which is undesirable. In a typical supercritical reactor, there is insufficient time to fully mix the hydrocarbons with the supercritical fluid before the hydrocarbons begin reacting, thus mixing upstream of the reactor is required to produce a well-mixed stream of hydrocarbons and supercritical fluid. Sequential injection of water to hydrocarbon feedstock can achieve good mixing through sequential dissolution of resin and aromatics. Sequential mixing can be beneficial when the water to oil ratio increases through the sequential mixer, because in the initial stage, when there is a low water to oil ratio, asphaltenes can be well dispersed within the small amount of water because less aromatics and resin can be dissolved into the small amount of water. Therefore, at least one objective of sequential mixing is to maintain asphaltene in a dispersed state. Improved mixing results in higher conversion of hydrocarbons into liquid phase product under supercritical water condition. One of the advantages of multiple injections of supercritical fluid in the sequential mixer is that it reduces the local concentration gradient, a high local concentration gradient can lead to coke formation. A second advantage of multiple sequential injections of supercritical water is an increase in the liquid yield of the hydrocarbon product.

Supercritical fluids are those that at a temperature and pressure above its critical point the phase boundary between gas and liquid ceases to exist. Supercritical fluids useful in the present invention include pentane, toluene, and water. Water is a supercritical fluid above the critical temperature and critical pressure of water. The critical temperature of water is 373.946° C. (705.1028° F.). The critical pressure of water is 22.06 MPa (3,212 psi). The critical temperature of pentane is 196.7° C. The critical pressure of pentane is 3.36 MPa. The critical temperature of toluene is 318.64° C. The critical pressure is 4.109 MPa.

Referring to FIG. 1, a process for upgrading a hydrocarbon using the sequential mixer of the present invention is provided. Hydrocarbon stream 15 is fed to hydrocarbon pump 120 to create pressurized hydrocarbon stream 20. Hydrocarbon stream 15 can be from any source of hydrocarbon that would benefit from hydrocarbon conversion reactions. Exemplary hydrocarbon sources include petroleum-based hydrocarbons, coal-based hydrocarbons, and biomaterial-based hydrocarbons. In at least one embodiment of the present invention, hydrocarbon stream 15 includes hydrocarbons in gas-phase at ambient conditions.

Pressurized hydrocarbon stream 20 is at a pressure greater than the critical pressure of water, 22.1 MPa. In at least one embodiment of the present invention, the pressure of pressurized hydrocarbon stream 20 is greater than the critical pressure of the fluid in fluid stream 2. In at least one embodiment of the present invention, the pressure of pressurized hydrocarbon stream 20 is about 25 MPa. In at least one embodiment of the present invention, the pressure of pressurized hydrocarbon stream 20 is greater than about 25 MPa.

Pressurized hydrocarbon stream 20 is fed to hydrocarbon exchanger 130 to create heated hydrocarbon stream 30. Hydrocarbon exchanger 130 heats pressurized hydrocarbon stream 20 to a temperature of about 150° C., alternately to a temperature below about 150° C., alternately to a temperature between about 30° C. and about 150° C., alternately to a temperature between about 50° C. and about 150° C., and alternately to a temperature between about 50° C. and 100° C. Pressurized hydrocarbon stream 20 is heated to a temperature above room temperature because mixing a hydrocarbon stream and supercritical water at room temperature and then heating the mixed stream to a temperature above the critical temperature of water can induce coke formation due to the length of time needed for heating because of the absence of a "preheating" step for the hydrocarbon stream. During the long heating stage, asphaltene will form aggregates which can be converted to coke easily. In preferred instances, pressurized hydrocarbon stream 20 is preheated to a temperature below about 150° C., and more preferably to about 100° C., and then mixed with supercritical water before being heated to a temperature above the 150° C. The first preheating step, separate from heating of the water, can prevent the formation of coke precursor, such as localized asphaltene, because the asphaltene does not have the time to form aggregates. Also, separate pressurizing and preheating allows for better energy recovery from reactor effluent if heat balancing across the production unit is desired. Fluid stream 2 and hydrocarbon stream 15 are pressurized and heated separately.

Fluid stream 2 is fed to high pressure pump 100 to create pressurized fluid stream 5. Fluid stream 2 can be any fluid capable of being mixed at the supercritical conditions of that fluid with hydrocarbons to serve as the reaction medium for the hydrocarbons. Exemplary fluids for use in fluid stream 2 include water, pentane, and toluene. In at least one embodiment of the present invention, fluid stream 2 is water.

Pressurized fluid stream 5 is at a pressure greater than the critical pressure of the fluid in pressurized fluid stream 5. In at least one embodiment of the present invention, the pressure of pressurized fluid stream 5 is greater than 22.1 MPa. In at least one embodiment of the present invention, pressurized fluid stream 5 is 25 MPa. In at least one embodiment of the present invention, pressurized fluid stream 5 is greater than 25 MPa. Pressurized fluid stream 5 is fed to fluid heat exchanger 110 to create supercritical fluid 10.

Fluid heat exchanger 110 heats pressurized fluid stream 5 to a temperature above the critical temperature of the fluid in pressurized fluid stream 5. Supercritical fluid 10 is a supercritical fluid at conditions above the critical temperature and critical pressure of the fluid. In at least one embodiment of the present invention, supercritical fluid 10 is supercritical water above the critical pressure and critical temperature of water.

Supercritical fluid 10 and heated hydrocarbon stream 30 are fed to sequential mixer 140 to produce intimately mixed stream 40. In embodiments where the supercritical fluid in supercritical fluid 10 is water, the volumetric ratio of water to hydrocarbon entering sequential mixer 140 at standard ambient temperature and pressure (SATP) is between about 1:10 and about 1:0.1, and alternately between about 1:10 and about 1:1. In embodiments where the supercritical fluid in supercritical fluid 10 is pentane, the volumetric ratio of pentane to hydrocarbon entering sequential mixer 140 at standard ambient temperature and pressure (SATP) is between about 1:10 and about 1:0.1, and alternately between about 1:10 and about 1:1. In embodiments where the supercritical fluid in supercritical fluid 10 is toluene, the volumetric ratio of toluene to hydrocarbon entering sequential mixer 140 at standard ambient temperature and pressure (SATP) is between about 1:10 and about 1:0.1, and alternately between about 1:10 and about 1:1.

Intimately mixed stream 40 has a mixed temperature. The mixed temperature is the temperature of intimately mixed stream 40. Mixed temperature is between about 150° C. and about 400° C., alternately between about 150° C. and about 373° C., alternately between about 150° C. and about 350° C., alternately between about 200° C. and about 350° C., alternately between about 250° C. and about 350° C., and alternately between 350° C. and about 400° C. The pressure of intimately mixed stream 40 is above the critical pressure of the fluid in supercritical fluid 10.

Intimately mixed stream 40 is fed to supercritical reactor 150 to produce effluent stream 50. Supercritical reactor 150 is maintained at or above the critical temperature and critical pressure of the fluid in supercritical fluid 10. Hydrocarbons present in intimately mixed stream 40 undergo conversion reactions in supercritical reactor 150. As used herein, "conversion reactions" or "hydrocarbon conversion reactions" refers to any reaction that convert feed molecules to other molecules and includes cracking, desulfurization, demetallization, denitrogenation, deoxygenation, isomerization, alkylation, cyclization, aromatization, and other reactions that occur in the presence of thermal energy. Conversion reactions encompass a broader meaning than "upgrading" as upgrading refers to the narrow reaction of converting heavy molecules to light molecules to increase the API gravity. The residence time of intimately mixed stream 40 in supercritical reactor 150 is longer than about 10 seconds, alternately between about 10 seconds and about 5 minutes, and alternately between about 10 seconds and 100 minutes. The residence time of intimately mixed stream 40 in supercritical reactor 150 can be selected based on a targeted conversion level. The residence time of intimately mixed stream 40 in supercritical reactor 150 is longer than that in sequential mixer 140. In at least one embodiment of the present invention, catalyst can be added to supercritical reactor 150 to catalyze the conversion reactions. In at least one embodiment of the present invention, supercritical reactor 150 is in the absence of catalyst. In at least one embodiment of the present invention, externally supplied hydrogen can be added to supercritical reactor 150. In at least one embodiment of the present invention, supercritical reactor 150 is in the absence of externally supplied hydrogen.

Effluent stream 50 is fed to product exchanger 160 to produce cooled effluent stream 60. Cooled effluent stream 60 is at a temperature below the critical temperature of the fluid in fluid stream 2.

Cooled effluent stream 60 is fed to pressure reducer 170 to produce product stream 70. Product stream 70 is at a pressure below the critical pressure of the fluid in fluid stream 2.

Product stream 70 is fed to gas-liquid product separator 180 to produce vapor phase product 80 and liquid phase product 85.

Liquid phase product 85 is fed to liquid product separator 190 to produce upgraded hydrocarbon 90 and recovered fluid 95. Upgraded hydrocarbon 90 has an increased aromatic content and lower pour as compared to hydrocarbon stream 15. The liquid yield of upgraded hydrocarbon 90 is greater than 96%, alternately greater than 97%, alternately greater than 97.5%, and alternately greater than 98%.

Figure 2:
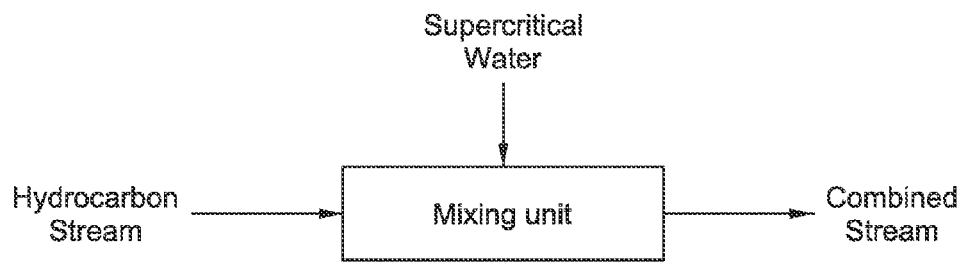
FIG. 2 provides a block diagram of an embodiment of a mixing unit according to the prior art.

Mixing units according to the prior art are shown in FIG. 2. A hydrocarbon stream is fed at one end of the mixing unit with the supercritical water being fed in the middle of the mixing unit. A traditional mixing unit could be a static mixer consisting of a metal pipe.

Figure 3:
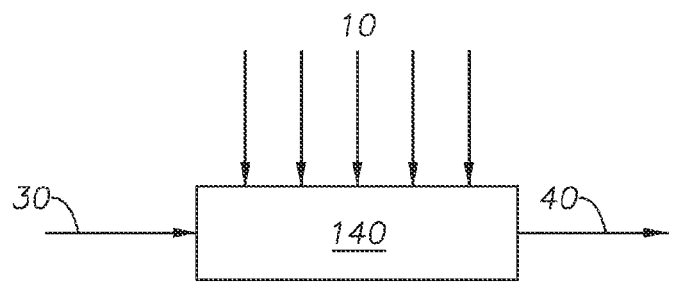
FIG. 3 provides a block diagram of an embodiment of a sequential mixer according to the present invention.
Figure 4A:
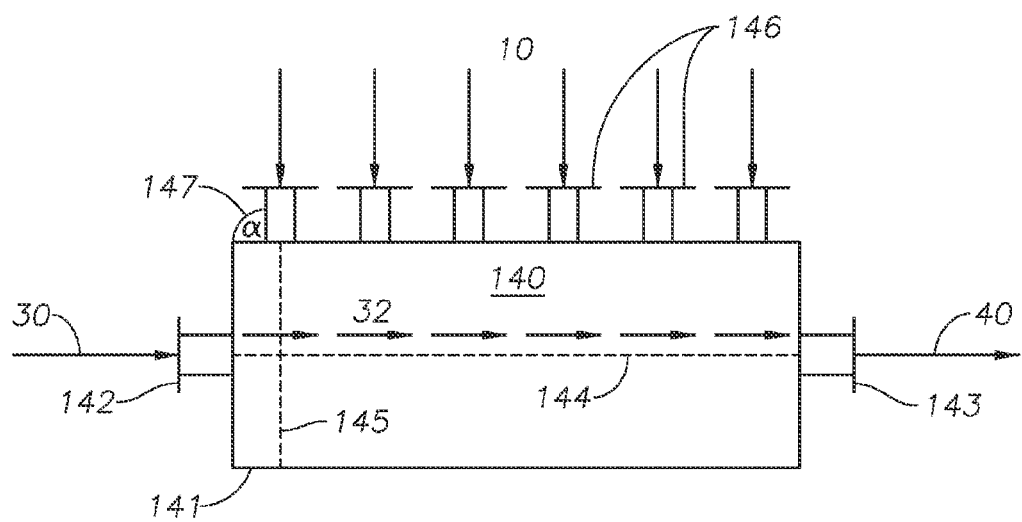
FIG. 4a provides a side plan view of an embodiment of the sequential mixer according to the present invention.
Figure 4B:
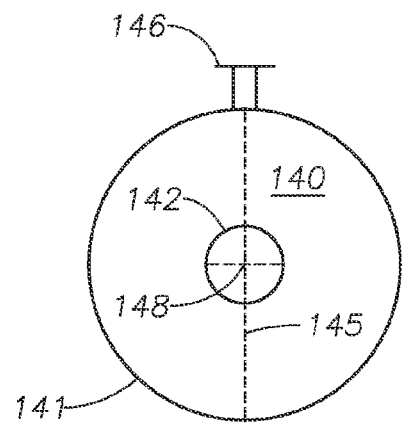
FIG. 4b provides a front plan view of an embodiment of the sequential mixer according to the present invention.
Figure 4C:
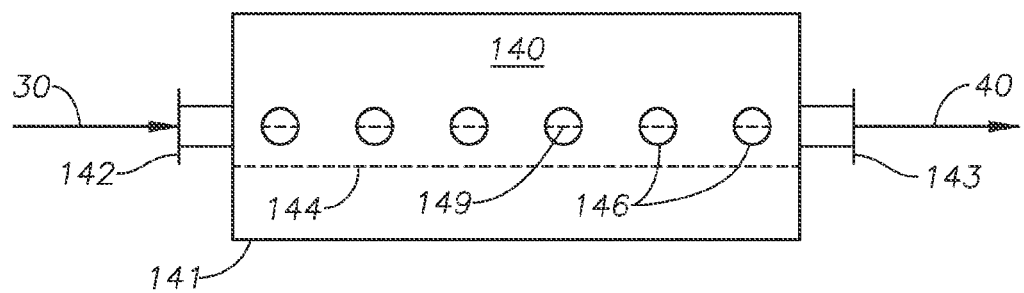
FIG. 4c provides a top plan view of an embodiment of the sequential mixer according to the present invention.
Figure 4D:
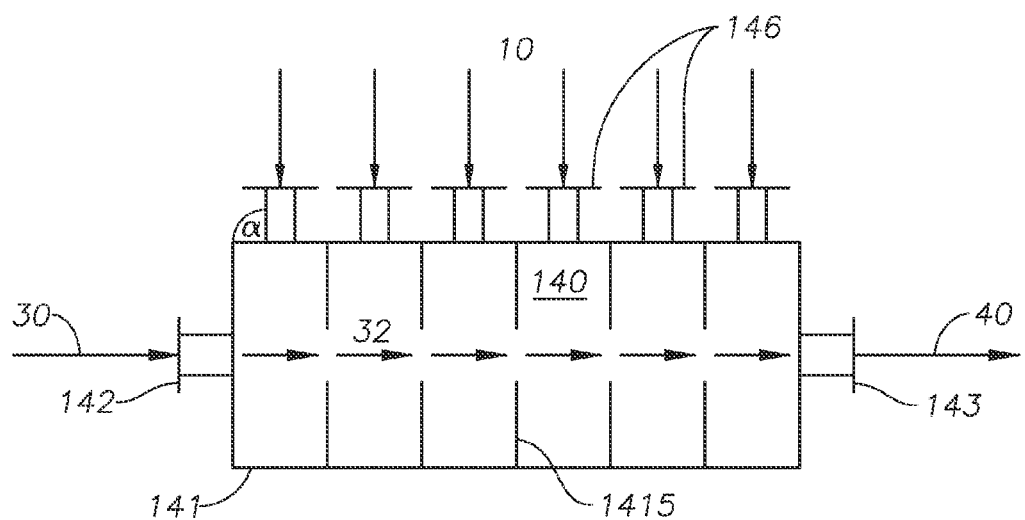
FIG. 4d provides a cross-sectional side plan view of an embodiment of the sequential mixer according to the present invention.

FIG. 3 shows a block diagram according to an embodiment of the present invention. Heated hydrocarbon stream 30 is fed at one end of the sequential mixer 140. Supercritical fluid 10 is separated into multiple streams and injected into heated hydrocarbon stream 30 flowing through sequential mixer 140. Injecting supercritical fluid 10 into heated hydrocarbon stream 30 causes supercritical fluid 10 to be dispersed into heated hydrocarbon stream 30 causing the hydrocarbons in heated hydrocarbon stream 30 to dissolve in the dispersed supercritical fluid 10. Allowing supercritical fluid 10 to be injected in multiple streams allows a stepwise addition of supercritical fluid. The number of streams that supercritical fluid 10 is separated into is determined by the volumetric flow rate of supercritical fluid 10, the temperature of supercritical fluid 10, and the size of sequential mixer 140. Heated hydrocarbon stream 30 and supercritical fluid 10 mix within sequential mixer 140 to produce intimately mixed stream 40. Sequential mixer 140 is capable of mixing supercritical fluid 10 and heated hydrocarbon stream 30 across laminar, turbulent, and transitional flow regimes. Achieving and maintaining the proper balance of flow regime within sequential mixer 140 is an important aspect of the design of sequential mixer 140. The hydrocarbons and supercritical fluids can be mixed even when not in a turbulent flow regime due to localized instability. Too much turbulence can extract aromatics and resins too quickly and result in aggregated asphaltenes. As used herein "intimate mixing" refers to mixing that achieves a well-mixed stream that tends toward a mixture that is more homogenous than the supercritical fluid 10 and hydrocarbon stream 30 separately.

Details of sequential mixer 140 are described herein with reference to FIGS. 4a-4d, 5a-5c, 6a-6c, and 7a-7d. With reference to FIG. 4a-d an embodiment of sequential mixer 140 is shown. Heated hydrocarbon stream 30 is fed to body 141 of sequential mixer 140 through hydrocarbon inlet 142.

Body 141 can be of any shape and dimensions that facilitate intimate mixing of heated hydrocarbon stream 30 and supercritical fluid 10. Exemplary shapes include cylinder (tube), cube, and rectangular prism. In a preferred embodiment, body 141 is a cylinder. In embodiments of the present invention where body 141 is a cylinder, the dimensions of body 141 include body diameter and body length. In embodiments of the present invention where body 141 is a cube or rectangular prism, body dimensions include body width and body length. Body 141 is designed to withstand an internal pressure above the critical pressure of the fluid in fluid stream 2 without suffering mechanical failure or defect. Body 141 can be constructed from one piece of metal by being bored out of a solid block, welded, or otherwise fastened together, so long as the resulting structure meets the internal design pressure. The body diameter of body 141 can be measured inclusive or exclusive of the thickness of the material of construction of body 141. In other words, body diameter can be given as inner diameter (exclusive of material thickness) or outer diameter (inclusive of material thickness). Unless otherwise indicated, body diameter in this description refers to the inner diameter of body 141. Body diameter is greater than 0.1", alternately greater than about 0.5", alternately greater than about 1", alternately greater than about 2", alternately greater than about 3", alternately between about 3" and about 5", alternately between about 5" and about 6", alternately between about 6" and about 12", and alternately greater than 12". In at least one embodiment, body 141 can be a standard pipe, such that body diameter is selected from a standard pipe size.

The body length of body 141 can be any length to encourage intimate mixing based on the volumetric flow rate of heated hydrocarbon stream 30 and supercritical fluid 10, the temperature of supercritical fluid 10, and the number of fluid ports 146. With respect to the effect of the temperature of supercritical fluid 10 on body length of body 141, the greater (hotter) the design of the temperature of supercritical fluid 10, the shorter the design of the body length of body 141 to reduce exposure of the hydrocarbons to high temperatures before entering supercritical reactor 150. Body length is between about 0.5" and about 24", alternately between about 1" and about 24", alternately between about 2" and about 24", alternately between about 3" and about 24", alternately between about 4" and about 24", alternately between about 5" and about 24", alternately between about 6" and about 24", alternately between about 7" and about 24", alternately between about 8" and about 24", alternately between about 9" and about 24", alternately between about 10" and about 24", alternately between about 11" and about 24", alternately between about 12" and about 24", alternately between about 14" and about 24", alternately between about 16" and about 24", alternately between about 18" and about 24", alternately between about 20" and about 24", alternately between about 22" and about 24", alternately greater than about 24".

Hydrocarbon inlet 142 has inlet diameter 148. In a preferred embodiment, sequential mixer 140 has one hydrocarbon inlet 142. In at least one embodiment of the present invention, sequential mixer 140 has two hydrocarbon inlets 142. Inlet diameter 148 is the diameter of hydrocarbon inlet 142. Values referred to herein for inlet diameter 148 are to inner diameter exclusive of the thickness of the material of construction of hydrocarbon inlet 142 unless otherwise indicated. Inlet diameter 148 is greater than 0.1", alternately greater than about 0.5", alternately greater than about 1", alternately greater than about 2", alternately greater than about 3", alternately between about 3" and about 5", alternately between about 5" and about 6", alternately between about 6" and about 12", and alternately greater than 12". In at least one embodiment of the present invention, inlet diameter 148 is the same as body diameter of body 141. In at least one embodiment of the present invention, hydrocarbon inlet 142 is a nozzle having standard nozzle dimensions.

Body 141 has traversing axis 144 extending through the center of body 141 from hydrocarbon inlet 142 to mixed stream outlet 143. Cross-sectional axis 145 runs through body 141 perpendicular to traversing axis 144.

Supercritical fluid 10 is injected through fluid ports 146. Each fluid port 146 has a port volumetric flow rate. The port volumetric flow rate for each fluid port 146 is the flow rate of the fluid injected through that fluid port 146. In at least one embodiment of the present invention, the port volumetric flow rate is the same through each fluid port 146. In at least one embodiment of the present invention, the port volumetric flow rate is different through each fluid port 146. Throughout this description, references to volumetric flow rate, are references to volumetric flow rate at standard ambient temperature and pressure (SATP) unless other specified. Volumetric flow rate is defined at SATP and not operating condition because heating of liquid or gas fluid expands the volume of the fluid, so to maintain consistency, volumetric flow rate is defined at SATP. SATP is 25° C. and 0.987 atm (100.007775 kPa). In at least one embodiment of the present invention, there is no limitation on the superficial velocity of supercritical fluid 10 flowing through fluid ports 146.

Fluid ports 146 extend along the body length of body 141. The number of fluid ports 146 depends on the volumetric flow rate of supercritical fluid 10, the desired pressure drop across fluid ports 146, the temperature of supercritical fluid 10, and the size of sequential mixer 140. With respect to the effect of the temperature of supercritical fluid 10 on the number of fluid ports 146, the greater the temperature of supercritical fluid 10, the design number of fluid ports 146 is increased to minimize the rate at which the temperature of supercritical fluid 10 increases the temperature of heated hydrocarbon stream 30 and thus minimizes the rate of heating the in-mixer stream 32. There can be at least two fluid ports 146, alternately three fluid ports 146, alternately four fluid ports 146, alternately five fluid ports 146, alternately six fluid ports 146, alternately seven fluid ports 146, alternately eight fluid ports 146, alternately nine fluid ports 146, alternately ten fluid ports 146, and alternately greater than ten fluid ports 146. In at least one embodiment of the present invention, fluid ports 146 can form capillary.

Figure 5A:
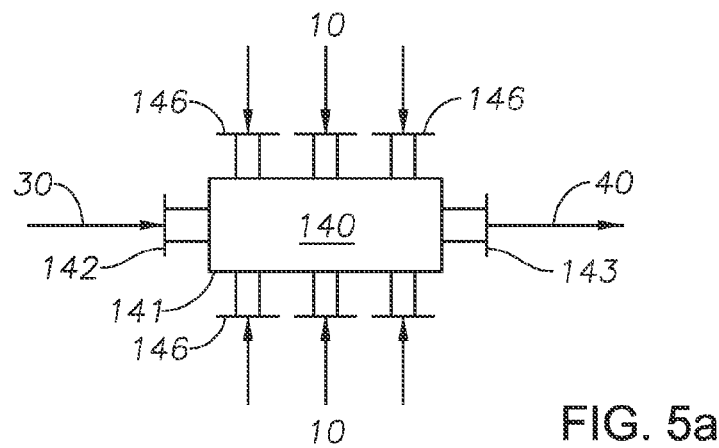
FIG. 5a provides a side plan view of an embodiment of the sequential mixer according to the present invention.
Figure 5B:
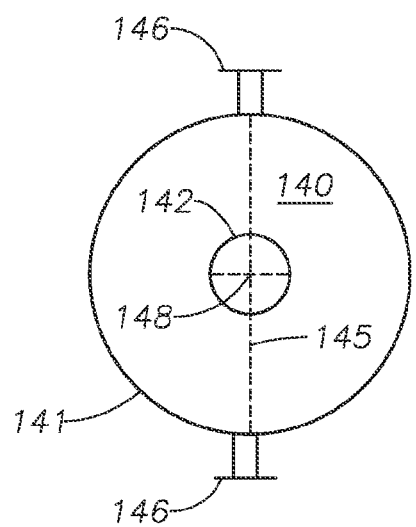
FIG. 5b provides a front plan view of an embodiment of the sequential mixer according to the present invention.
Figure 5C:
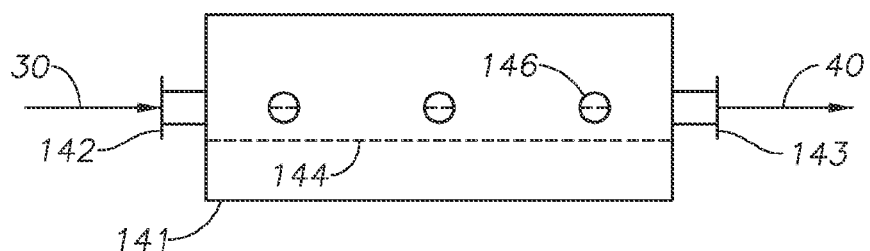
FIG. 5c provides a top plan view of an embodiment of the sequential mixer according to the present invention.
Figure 5D:
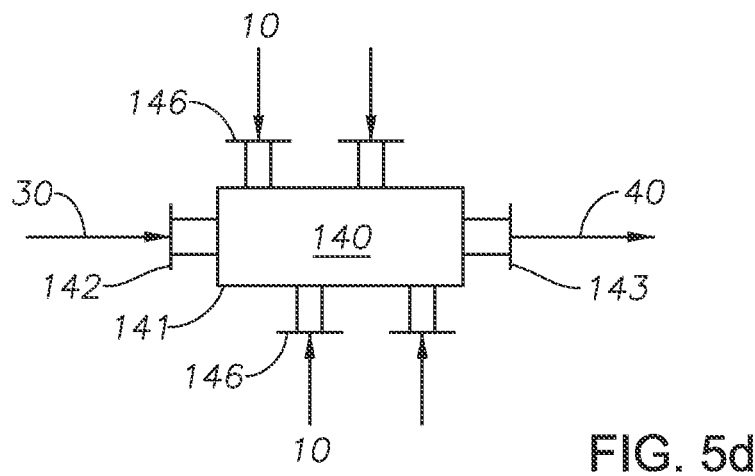
FIG. 5d provides a side plan view of an embodiment of the sequential mixer according to the present invention.
Figure 7A:
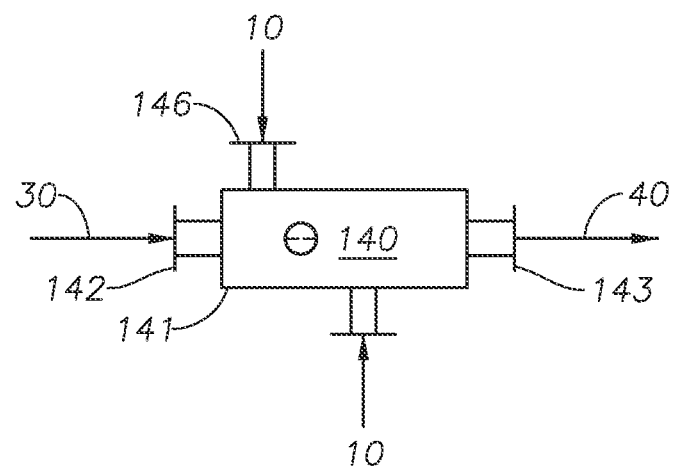
FIG. 7a provides a side plan view of an embodiment of the sequential mixer according to the present invention.
Figure 7B:
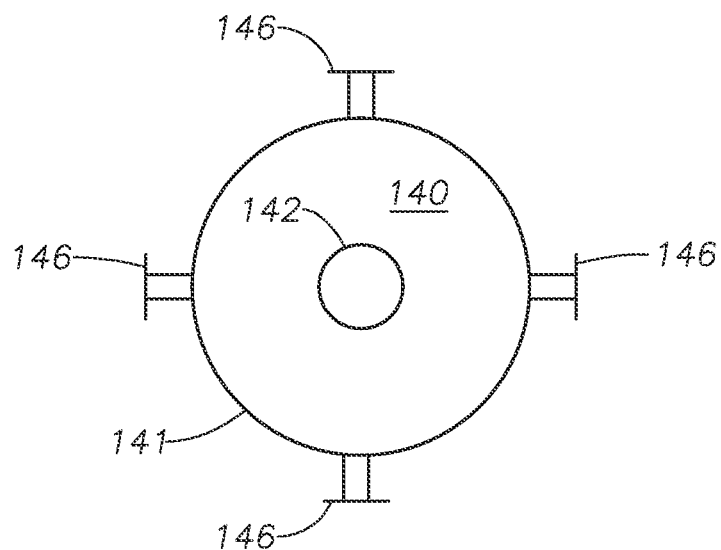
FIG. 7b provides a front plan view of an embodiment of the sequential mixer according to the present invention.
Figure 7C:
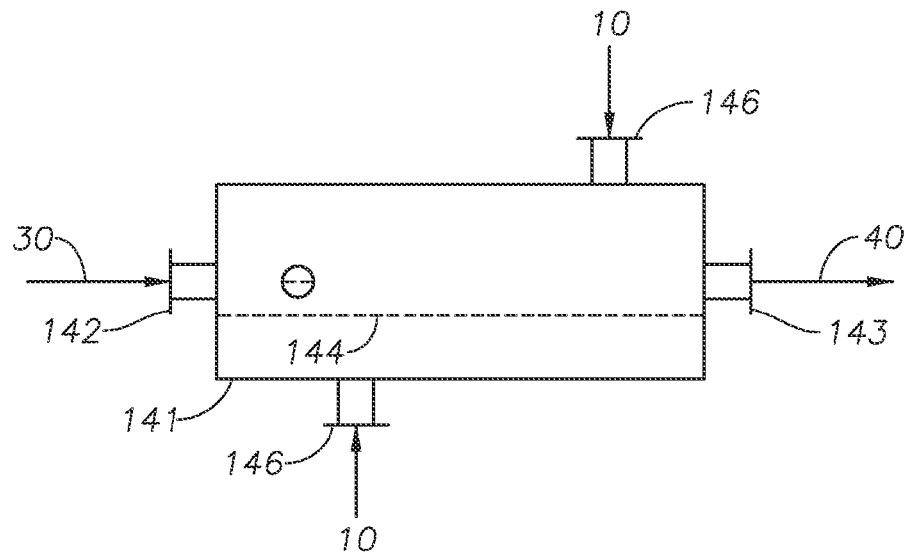
FIG. 7c provides a top plan view of an embodiment of the sequential mixer according to the present invention.
Figure 7D:
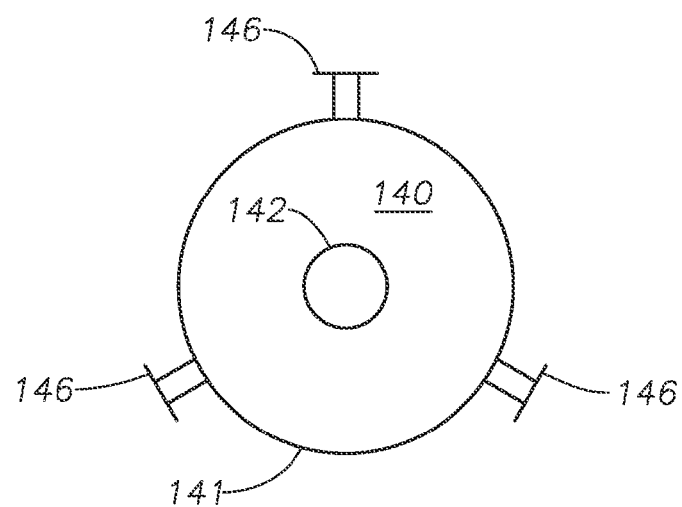
FIG. 7d provides a front plan view of an embodiment of the sequential mixer according to the present invention.

Fluid ports 146 are arrayed along traversing axis 144 and cross-sectional axis 145 of body 141 in a port alignment. The port alignment can be any configuration of fluid ports 146 along traversing axis 144, cross-sectional axis 145, and around the outside surface of body 141 that facilitate intimate mixing of supercritical fluid 10 and heated hydrocarbon stream 30. Exemplary port alignments include straight in-line, straight across, staggered across, spiral pattern, combinations thereof, and any other patter allowing intimate mixing in sequential mixer 140. As shown in FIGS. 4a-4d, the port alignment is straight in-line. FIG. 5a-c illustrates an embodiment of sequential mixer 140 with fluid ports 146 in a straight across port alignment. FIG. 5d illustrates an embodiment of sequential mixer with four fluid ports 146 in a staggered across port alignment. FIG. 7a-c illustrates an embodiment of sequential mixer 140 with four fluid ports 146 in a spiral pattern port alignment. FIG. 7d illustrates an embodiment of sequential mixer 140 with three fluid ports 146 having a spiral pattern port alignment.

Fluid ports 146 have port diameter 149. Port diameter 149 is the diameter of fluid port 146. Values referred to herein for port diameter 149 are to inner diameter exclusive of the thickness of the material of construction of fluid port 146 unless otherwise indicated. Port diameter 149 of fluid port 146 is greater than about 0.1", alternately between about 0.1" and about 1", alternately between about 0.2" and about 1", alternately between about 0.3" and about 1", alternately between about 0.4" and about 1", alternately between about 0.5" and about 1", alternately between about 0.6" and about 1", alternately between about 0.7" and about 1", alternately between about 0.8" and about 1", alternately between about 0.9" and about 1", and alternately greater than about 1". In at least one embodiment of the present invention, port diameter 149 is less than 0.1". In at least one embodiment of the present invention, port diameter 149 is different from port diameter inlet diameter 148. In at least one embodiment of the present invention, port diameter 149 is less than inlet diameter 148. In at least one embodiment of the present invention, each fluid port 146 of sequential mixer 140 has the same port diameter 149. In at least one embodiment of the present invention, each fluid port 146 of sequential mixer 140 has a different port diameter 149. In at least one embodiment of the present invention, there are at most two different diameters of fluid ports 146 of sequential mixer 140.

Figure 6A:
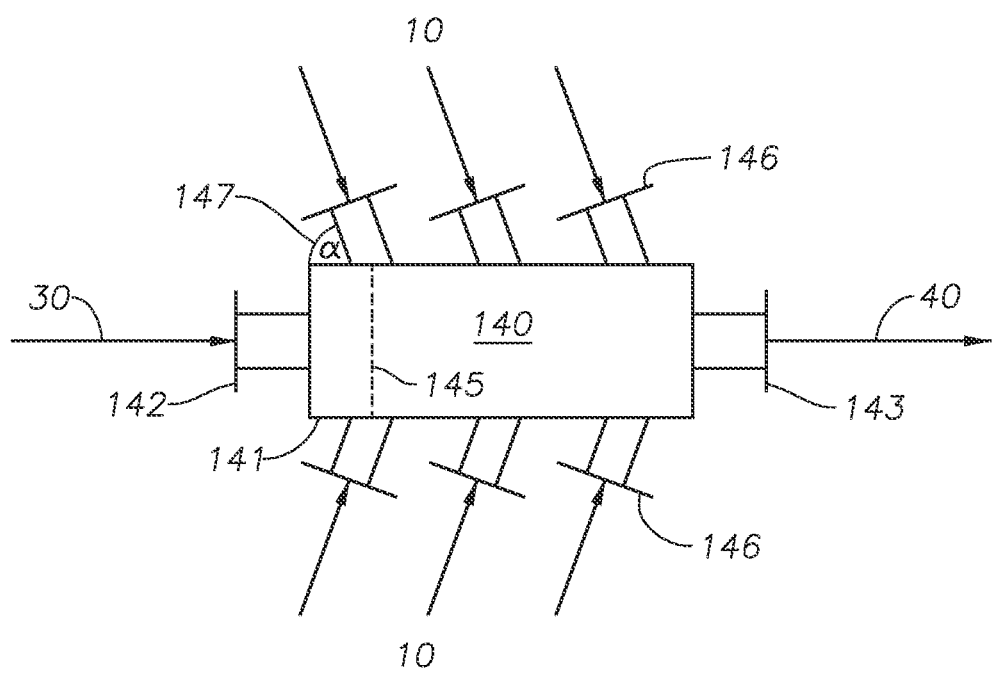
FIG. 6a provides a side plan view of an embodiment of the sequential mixer according to the present invention.
Figure 6B:
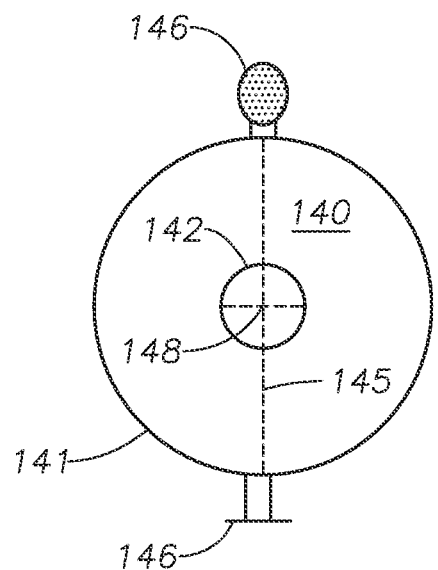
FIG. 6b provides a front plan view of an embodiment of the sequential mixer according to the present invention.
Figure 6C:
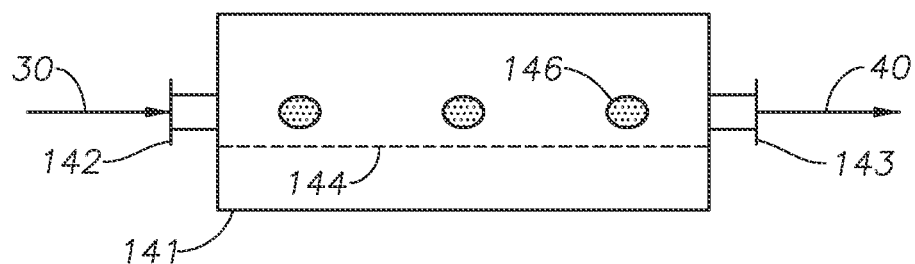
FIG. 6c provides a top plan view of an embodiment of the sequential mixer according to the present invention.

Fluid ports 146 have port angle 147. Port angle 147 is the angle between fluid port 146 and body 141 of sequential mixer 140. In FIG. 4a-4d, port angle 147 is 90°. FIG. 6a-c illustrates an embodiment of sequential mixer 140 with fluid ports 146 having port angle 147 of less than 90°. Throughout, the term "deg." is used interchangeably with the symbol for degree) (°. Port angle 147 can be between about 1° and about 90°, alternately between about 10° and about 90°, alternately between about 20° and about 90°, alternately between about 30° and about 90°, alternately between about 40° and about 90°, alternately between about 45° and about 90°, alternately between about 50° and about 90°, alternately between about 60° and about 90°, alternately between about 70° and about 90°, and alternately between about 80° and about 90°. In at least one embodiment of the present invention, port angle 147 is 90°. In at least one embodiment of the present invention, port angle 147 is 45°. In at least one embodiment of the present invention, port angle 147 is less than 45°. In at least one embodiment of the present invention, port angle 147 is between 45° and 90°.

In at least one embodiment of the present invention, supercritical fluid 10 injected through fluid ports 146 is the same temperature through each fluid port 146. In at least one embodiment of the present invention, supercritical fluid 10 injected through fluid ports 146 is a different temperature through each fluid port 146. In at least one embodiment of the present invention, the temperature of supercritical fluid 10 through each fluid port 146 can be adjusted by adjusting the thickness of insulation on fluid port 146 and each individual line from each fluid port 146 back to the separation piping or tubing downstream from fluid heat exchanger 110.

Heated hydrocarbon stream 30 and supercritical fluid 10 mix within body 141 to produce in-mixer stream 32. The composition of in-mixer stream 32 changes as it progress through body 141 with each addition of supercritical fluid 10 through another fluid port 146. In at least one embodiment of the present invention, in-mixer stream 32 is in the absence of droplets of heated hydrocarbon stream 30. In at least one embodiment of the present invention, the hydrocarbons in in-mixer stream 32 dissolve or substantially in the supercritical fluid in in-mixer stream 32, except for the asphaltenic portion which stays as droplets. In at least one embodiment of the present invention, dispersion and/or dissolution of hydrocarbons in the supercritical fluid occurs once contact has been made in-mixer stream 32. In at least one embodiment of the present invention, in-mixer stream 32 is an emulsion. In at least one embodiment of the present invention, the in-mixer temperature of in-mixer stream 32 is maintained at a point below the temperature at which hydrocarbon cracking reactions occur. Preventing hydrocarbon cracking reactions is preferred because cracking reactions are symmetric with coking reactions in that both reactions are initiated by radicals, by avoiding hydrocarbon cracking reactions, coking reactions can be minimized which minimizes the formation of coke or sludge-like coke precursor. Avoidance of coke or sludge-like coke precursor is desirable because the substances can inhibit or limit the flow of in-mixer stream 32 leading to process instability. In at least one embodiment of the present invention, in-mixer stream 32 has an in-mixer temperature of less than 400° C. In at least one embodiment of the present invention, in-mixer stream 32 has an-mixer temperature between 150° C.

and 400° C. In at least one embodiment of the present invention, body 141 has a heating element to maintain a constant in-mixer temperature of in-mixer stream 32. Exemplary heating elements include heat tracing and thermal insulation.

In-mixer stream 32 exits body 141 through mixed stream outlet 143. In at least one embodiment of the present invention, sequential mixer 140 is in the absence of multiple mixed stream outlets 143. Designing sequential mixer 140 for one outlet is preferred because with multiple outlets controlling for equal flow rate through each outlet poses difficulties. Assuming each outlet has the same inner diameter and length, even a difference in temperature can influence the flow rate, cause a difference that leads to plugging in one of the outlets by settling of undissolved components in the outlet stream. Mixed stream outlet 143 has an outlet diameter. The outlet diameter is the diameter of mixed stream outlet 143. In a preferred embodiment, sequential mixer 140 has one mixed stream outlet 143. The outlet diameter is the diameter of hydrocarbon inlet 142. Values referred to herein for the outlet diameter refer to the inner diameter exclusive of the thickness of the material of construction of the outlet diameter unless otherwise indicated. The outlet diameter of mixed stream outlet 143 is greater than 0.1", alternately greater than about 0.5", alternately greater than about 1", alternately greater than about 2", alternately greater than about 3", alternately between about 3" and about 5", alternately between about 5" and about 6", alternately between about 6" and about 12", and alternately greater than 12". In at least one embodiment of the present invention, the outlet diameter is the same as the body diameter of body 141. In at least one embodiment of the present invention, mixed stream outlet 143 is a nozzle having standard nozzle dimensions.

In at least one embodiment of the present invention, body 141 of sequential mixer 140 includes flow restrictors 1415. Without being bound to a particular theory, it is believed that flow restrictors increase instability of in-mixer stream 32 and therefore enhance mixing. Instability plays a role in preventing precipitation of coke and other heavy materials in the reactor. Unstable flow is characterized by being locally irregular, having high diffusivity, and having high dissipation. The more unstable a flow the more mixed the hydrocarbons can be within the supercritical fluid, reducing the likelihood of producing coke. Flow restrictors 1415 are placed downstream of the mixing point of each fluid port 146. A "mixing point" is the point in sequential mixer 140 where supercritical fluid 10 is injected through fluid port 146 meets in-mixer stream 32. In this respect, flow restrictors 1415 enhance mixing of stream that has already begun mixing. In at least one embodiment of the present invention, flow restrictors 1415 are placed away from the mixing point of in-mixer stream 32 and supercritical fluid 10 as injected through fluid port 146. In at least one embodiment of the present invention, flow restrictor 1415 is an orifice plate, where the orifice diameter is smaller than the body diameter. In at least one embodiment of the present invention, flow restrictor 1415 is a filter comprising sintered metals. In at least one embodiment of the present invention flow restrictor 1415 is a filter comprising metallic membranes. In at least one embodiment of the present invention, flow restrictor 1415 is in the absence of a thermocouple. In at least one embodiment of the present invention, flow restrictors 1415 are placed downstream of each mixing point in sequential mixer 140. In at least one embodiment of the present invention, there are fewer flow restrictors 1415 than mixing points. In at least one embodiment, flow restrictor 1415 can be placed upstream of the first fluid port 146, in the direction of fluid flow. Placing a flow restrictor upstream of all fluid ports can reduce any potential gradient of temperature and concentration of the hydrocarbons in in-mixer stream 32, which can encourage mixing of the hydrocarbons in in-mixer stream 32 and can have a beneficial effect on downstream mixing with the supercritical fluid. Flow restrictors 1415 can be placed in any combination upstream, in between, or downstream of the fluid ports, in multiples or singularly within sequential mixer 140.

FIG. 8 illustrates an embodiment of sequential mixer 140 that includes mixing chamber 1405 between two bodies 141. Mixing chamber 1405 can be any shape and dimensions to facilitate intimate mixing of the hydrocarbons and supercritical fluid present in in-mixer stream 32 in mixing chamber 1405. In at least one embodiment of the present invention, mixing chamber 1405 includes an agitator. In at least one embodiment of the present invention, the chamber residence time, the residence time of in-mixer stream 32 in mixing chamber 1405, is at least one second, alternately between one second and five seconds, and alternately between two seconds and four seconds. Mixing chamber 1405 is designed to have a chamber residence time that prevents reaction from occurring in mixing chamber 1405.

FIG. 9 illustrates an embodiment of sequential mixer 140 that includes tail tube 1425 downstream of body 141. Tail tube 1425 provides additional volume for further mixing of in-mixer stream 32. In at least one embodiment of the present invention, sequential mixer 140 includes two tail tubes downstream of body 141. Tail tube 1425 can be any shape or dimension that facilitates intimate mixing of in-mixer stream 32. Exemplary shapes of tail tube 1425 include cylinder, rectangular prism, and spiral (or coiled). In at least one embodiment of the present invention, tail tube 1425 is a cylinder. In at least one embodiment of the present invention, tail tube 1425 is a spiral. Tail tube 1425 has a tail tube diameter. In at least one embodiment of the present invention, tail tube 1425 is a standard pipe, such that the tail tube diameter is selected from a standard pipe size. Tail tube 1425 has a tail length, which is the length of tail tube 1425. In an embodiment where tail tube 1425 is coil shaped, the length is an equivalent length, as if the coil of tail tube 1425 were straightened and measured end to end. In at least one embodiment of the present invention, the tail length of tail tube 1425 is at least twice the body length of body 141. In at least one embodiment of the present invention, the tail length of tail tube 1425 is twice the body length of body 141. In at least one embodiment of the present invention, the tail length of tail tube 1425 is less than twice the body length of body 141. In at least one embodiment of the present invention, the tail length of tail tube 1425 is equal to the body length of body 141. In at least one embodiment of the present invention, the tail length of tail tube 1425 is less than the body length of body 141.

In at least one embodiment of the present invention, the temperature in tail tube 1425 is maintained at less than 400° C. In at least one embodiment of the present invention, the temperature in tail tube 1425 is maintained between 150° C. and 400° C. In at least one embodiment of the present invention, tail tube 1425 has a heating element to maintain a constant. Exemplary heating elements include heat tracing and thermal insulation.

In at least one embodiment of the present invention, sequential mixer 140 is in the absence of an ultrasonic wave generator or source of ultrasonic wave energy. In at least one embodiment of the present invention, the process for hydrocarbon conversion is in the absence of an ultrasonic wave generator or a source of ultrasonic wave energy.

Heated hydrocarbon stream 30 cannot be injected into supercritical fluid 10 through fluid ports 146, where supercritical fluid 10 enters sequential mixer 140 through hydrocarbon inlet 142. In such a design, the initial relative water to oil ratio will be high, meaning more water than oil, in some instances the flow rate of supercritical water can be as much as 4 times higher than the flow rate of oil through one fluid port. The aromatic and resin components of the hydrocarbon stream, which stabilize the asphaltene in a well dispersed state, can be readily dissolved when the water to oil ratio is high. While this design can produce mixing of the aromatic and resin, the asphaltene, without the aromatic and resin stabilizer, can be swollen by the supercritical water to generate tiny droplets of asphaltene. The tiny droplets of asphaltene exposed to a sudden increase in temperature to the critical point of water provides a point for coke formation.

EXAMPLE

Example 1

A process for converting hydrocarbons was simulated using a sequential mixer with the following configuration: one hydrocarbon inlet and four fluid ports with an in-line port alignment. The supercritical fluid, in this example supercritical water, was divided into four equal streams and injected into the four fluid ports such that the volumetric flow rate through each fluid port was 25 ml/min at standard ambient temperature and pressure (SATP). The heated hydrocarbon stream was fed into the sequential mixer through the hydrocarbon inlet so that the volumetric flow rate of the heated hydrocarbon stream was 100 ml/min at standard ambient temperature and pressure. The 100 ml/min of the heated hydrocarbon stream mingled with the 25 ml/min supercritical water injected through the fluid port closest to the hydrocarbon inlet to create an in-mixer stream with a water to oil volumetric ratio of 0.25 to 1. A ratio of water to oil of 0.25 to 1 is too low to accommodate all the resins and aromatics in the heated hydrocarbon stream, so the resin and aromatics were still dispersing asphaltenes. The 125 ml/min of the in-mixer stream then mingled with the 25 ml/min supercritical water injected through the next fluid port creating a water to oil volumetric ratio of 0.5 to 1 in the in-mixer stream. The 150 ml/min of the in-mixer stream then mingled with the 25 ml/min supercritical water injected through the third fluid port creating a water to oil volumetric ratio of 0.75 to 1. A water to oil volumetric ratio of 0.75 to 1 is enough to extract almost all of the resin and aromatics from the hydrocarbons in the in-mixer stream. Due to the dissolution of resins and aromatics, the asphaltenes start to aggregate. At about the same time, the supercritical water starts to swell the asphaltene which is then popped up to tiny droplets of hydrocarbons. Finally, the 175 ml/min of the in-mixer stream meets the 25 ml/min of the last fluid port and mixes to create a water to oil volumetric ratio of 1 to 1. A water to oil volumetric ratio of 1 to 1 is sufficient to dissolve or disperse the tiny droplets, which are originated from asphaltene. The temperature of the in-mixer stream was maintained below 400° C. to avoid condensation reactions between asphaltene in the aggregate phase.

Example 2

A process for converting hydrocarbons was simulated using a sequential mixer with the following configuration: one hydrocarbon inlet and three fluid ports with an in-line port alignment. The supercritical fluid, in this example supercritical water, was divided into three equal streams and injected through the three fluid ports such that the volumetric flow rate through each fluid port was 20 barrel/day at standard ambient temperature and pressure (SATP). The heated hydrocarbon stream was fed into the sequential mixer through the hydrocarbon inlet so that the volumetric flow rate of the heated hydrocarbon stream was 60 barrel/day at standard ambient temperature and pressure. The temperature of supercritical water is controlled to be different through each of the fluid ports. The temperature of supercritical water through the port closest to the hydrocarbon inlet was controlled to be 500° C. The temperature of the supercritical water through the next port was controlled to be 550° C. The temperature of the supercritical water through the last port was controlled to be 600° C. The 60 barrel/day of the heated hydrocarbon stream mingled with the 20 barrel/day at 500° C. supercritical water injected through the fluid port closest to the hydrocarbon inlet to create an in-mixer stream with a temperature of 295° C. A temperature of 295° C. is too low to have enough solubility toward resin and aromatics. Resin and aromatics are partially dissolved while keeping asphaltene in good dispersion. The 80 barrel/day of the in-mixer stream then mingled with the 20 barrel/day at 550° C. supercritical water injected through the next fluid port increasing the temperature of the in-mixer stream to a temperature of 364° C. At this temperature, water started to swell the asphaltene while suppressing hydrocarbon conversion reactions. The 100 barrel/day of the in-mixer stream then mingled with the 20 barrel/day at 600° C. supercritical water injected through the third fluid port increasing the temperature of the in-mixer stream to a temperature of 373° C. At this temperature, tiny droplets of asphaltene begin to disperse into the supercritical water.

Example 3

Example 3 was simulated based on the process as shown in FIG. 1. Hydrocarbon stream 15 was fed to hydrocarbon pump 120 and pressurized to a pressure greater than the critical pressure of water to produce pressurized hydrocarbon stream 20. Pressurized hydrocarbon stream 20 was fed to hydrocarbon exchanger 30 and heated to a temperature of 50° C. to produce heated hydrocarbon stream 30. Fluid stream 15, in this example water, was fed to high pressure pump 100 and pressurized to a pressure greater than the critical pressure of water to produce pressurized fluid stream 5. Pressurized fluid stream 5 was fed to fluid heat exchanger 110 and heated to a temperature greater than the critical temperature of water to produce supercritical fluid 10. Supercritical fluid 10 was then split into three (3) streams with each stream having a flow rate of 20 barrels/day at SATP. Sequential mixer 140 produced intimately mixed stream 40. Intimately mixed stream 40 has a temperature above the critical temperature of water and below 400° C. and a pressure greater than the critical pressure of water. Intimately mixed stream 40 was fed to supercritical reactor 150, where the hydrocarbons undergo conversion reactions. The residence time of the fluid in supercritical reactor was less than 10 seconds. Supercritical reactor 150 produces effluent stream 50.

TABLE 1

Stream Operating Conditions

| | Pressurized Hydrocarbon Stream 20 | Pressurized Fluid stream 5 | Heated Hydrocarbon Stream 30 | Supercritical Fluid 10 | Intimately Mixed Stream 40 | Effluent Stream 50 |
|---|---|---|---|---|---|---|
| Temp (° C.) | 25 | 25 | 50 | 500 | 370 | 450 |
| Pressure (MPa) | 25 | 25 | 25 | 25 | 24.8 | 24.8 |

TABLE 2

Stream Properties

| Properties | Hydrocarbon Feedstock | Upgraded Hydrocarbon Stream |
|---|---|---|
| Specific Gravity (API) | 17 | 24 |
| Asphaltene (wt %) | 13 | 2.0 |
| Sulfur (wt % S) | 3.2 | 2.6 |

Comparative Example

Example 4

Example 4 compared a mixing unit according to FIG. 2 and a sequential mixer 140 of the present invention in the process simulated based on the process diagram of FIG. 1.

The same feed conditions for the two simulations were used with respect to hydrocarbon stream 15 and fluid stream 2 and can be seen in Table 3. Hydrocarbon stream 15, at 24 L/day, was fed to hydrocarbon pump 120 and pressurized to 25 MPa, a pressure greater than the critical pressure of water, to produce pressurized hydrocarbon stream 20. Pressurized hydrocarbon stream 20 was fed to hydrocarbon exchanger 30 and heated to a temperature of 125° C., less than the critical temperature of water, to produce heated hydrocarbon stream 30. Fluid stream 15, in this example water at 24 L/day as measured at standard ambient temperature and pressure, was fed to high pressure pump 100 and pressurized to 25 MPa, a pressure greater than the critical pressure of water, to produce pressurized fluid stream 5. Pressurized fluid stream 5 was fed to fluid heat exchanger 110 and heated to 450° C., a temperature greater than the critical temperature of water, to produce supercritical fluid 10. The volumetric ratio of water (as supercritical fluid 10) to hydrocarbon (as heated hydrocarbon stream 30) was 1:1 (vol:vol).

TABLE 3

Stream Conditions

| | Hydrocarbon Stream 15 | Pressurized Hydrocarbon Stream 20 | Heated Hydrocarbon Stream 30 | Fluid Stream 2 | Pressurized Fluid Stream 5 | Supercritical Fluid 10 |
|---|---|---|---|---|---|---|
| Temp (° C.) | 25 | 25 | 125 | 25 | 25 | 450 |
| Pressure (MPa) | 0.1 | 25.0 | 25.0 | 0.1 | 25.0 | 25.0 |

The mixing unit was modeled in the simulation as a mixing tee, according to FIG. 2, with an internal diameter of 0.12 inches (0.3048 cm). The hydrocarbon inlet to the mixing unit was modeled as a tubing having an outer diameter of 0.25 inches (0.635 cm). The supercritical water inlet was modeled as a tubing having an outer diameter of 0.25 inches (0.635 cm). The combined stream produced by the mixing unit was fed to supercritical reactor 150. Supercritical reactor 150 was modeled as a tubular vessel having an internal volume of 1 L. The operating conditions of the streams downstream of the mixing unit are shown in Table 4. A comparison of the components of the hydrocarbon stream and the upgraded hydrocarbon stream are shown in Table 5. The liquid yield produced using a mixing unit of FIG. 2 was 95 wt %.

TABLE 4

Stream Conditions

| Stream Name | Combined Stream | Reactor Effluent | Cooled Stream | Depressurized Stream |
|---|---|---|---|---|
| Temp (° C.) | 355 | 450 | 50 | 45 |
| Pressure (MPa) | 25 | 24.8 | 24.6 | 0.1 |

TABLE 5

Stream Properties

| Properties | Hydrocarbon Feedstock | Upgraded Hydrocarbon Stream |
|---|---|---|
| Specific Gravity (API) | 17 | 24 |
| Asphaltene (wt %) | 13 | 2.0 |
| Sulfur (wt % S) | 3.2 | 2.6 |

Sequential mixer 140 was modeled having one hydrocarbon inlet 142 with inlet diameter 148 having an inner diameter of 0.125 inches. Sequential mixer 140 was modeled as a cylinder (tube) with a body length of 5 inches (cm)

and a body diameter of 0.375 inch outer diameter (O. D.) and 0.125 inch (I. D.). The volumetric flow of supercritical fluid 10 was divided evenly between four fluid ports 146 such that each fluid port 146 had a volumetric flow rate of 6 L/day at SATP. Fluid ports 146 were arranged in a straight in-line port alignment. Fluid ports 146 were modeled with port diameter 149 of 0.25 inch outer diameter and 0.0625 inner diameter and a 1 inch space between each fluid port 146. Flow restrictors 1415 with a 0.0625 inch inner diameter (hole size) were modeled as being placed between each fluid port 146 for a total of three flow restrictors 1415. Mixed stream outlet 143 was modeled to connect to supercritical reactor 150 with a 0.25 inch outer diameter. Supercritical reactor 150 was modeled as a tubular vessel having an internal volume of 1 L. The operating conditions of the streams downstream of sequential mixer 140 are shown in Table 6. A comparison of the components of the hydrocarbon stream and the upgraded hydrocarbon stream are shown in Table 7. The liquid yield produced using sequential mixer 140 was 97 wt %. A comparison of the upgraded hydrocarbon stream produced using a mixer according to FIG. 2 and sequential mixer 140 are shown in Table 8.

TABLE 6

Stream Operating Conditions

| Stream Name | Intimately Mixed Stream 40 | Effluent Stream 50 | Cooled Effluent 60 | Product Stream 70 |
|---|---|---|---|---|
| Temp (° C.) | 368 | 450 | 50 | 45 |
| Pressure (MPa) | 25 | 24.8 | 24.6 | 0.1 |

TABLE 7

Stream Properties

| Properties | Hydrocarbon Stream 15 | Upgraded Hydrocarbon Stream 90 |
|---|---|---|
| Specific Gravity (API) | 17 | 26 |
| Asphaltene (wt %) | 13 | 1.5 |
| Sulfur (wt % S) | 3.2 | 2.3 |

TABLE 8

Stream Properties

| Properties | Mixing Unit - Upgrade Hydrocarbon Stream | Sequential Mixer - Upgraded Hydrocarbon Stream 90 |
|---|---|---|
| Specific Gravity (API) | 24 | 26 |
| Asphaltene (wt %) | 2.0 | 1.5 |
| Sulfur (wt % S) | 2.6 | 2.3 |

The results show that sequential mixer 140, which provides for better mixing of the supercritical fluid, in this example water, with hydrocarbons results in higher liquid yields and improved quality of product.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

That which is claimed is:

1. A method for hydrocarbon conversion in a supercritical reactor of an intimately mixed stream produced by a sequential mixer upstream of the supercritical reactor, the method comprising the steps of:

introducing a heated hydrocarbon stream to a hydrocarbon inlet of the sequential mixer, the hydrocarbon inlet parallel to a traversing axis of the sequential mixer, wherein the heated hydrocarbon stream has a pressure greater than the critical pressure of water and a temperature between 30° C. and 150° C.;

injecting a supercritical fluid through a plurality of fluid ports of the sequential mixer, wherein the plurality of fluid ports are arranged in a port alignment arrayed along the traversing axis, wherein each fluid port of the plurality of fluid ports has a port volumetric flow rate, wherein the supercritical fluid has a pressure greater than the critical pressure of water and a temperature greater than the critical temperature of water;

allowing the heated hydrocarbon stream and supercritical fluid to mix in the sequential mixer to produce an intimately mixed stream, wherein the volumetric ratio of supercritical fluid to hydrocarbons in an in-mixer stream increases as the in-mixer stream passes each of the fluid ports of the plurality of fluid ports and the in-mixer stream receives a further injection of supercritical fluid, wherein the intimately mixed stream comprises hydrocarbons and supercritical fluid, wherein the intimately mixed stream has a mixed temperature;

transferring the intimately mixed stream to a supercritical reactor, the supercritical reactor maintained at a pressure above the critical pressure of water and a temperature above the critical temperature of water, wherein the hydrocarbons in the intimately mixed stream undergo hydrocarbon conversion reactions in the supercritical reactor to produce an effluent stream;

cooling the effluent stream in a product exchanger to produce a cooled effluent, the product exchanger configured to cool the effluent stream to a temperature below the critical temperature of water to produce the cooled effluent;

depressurizing the cooled effluent in a pressure reducer to produce a product stream, the pressure reducer configured to reduce the pressure of the cooled effluent to a pressure below the critical pressure of water to produce the product stream;

separating the product stream in a gas-liquid product separator to produce a vapor phase product and a liquid phase product;

separating the liquid phase product in a liquid product separator to produce an upgraded hydrocarbon stream and a recovered fluid stream.

2. The method of claim 1, wherein the sequential mixer further comprises:

a body, the body physically connected to the hydrocarbon inlet, the hydrocarbon inlet having an inlet diameter;

a mixed stream outlet, the mixed stream outlet physically connected to the body, the mixed stream outlet having an outlet diameter;

the traversing axis, the traversing axis extending through the center of the body from the hydrocarbon inlet to the mixed stream outlet;

a cross-sectional axis, the cross-sectional axis perpendicular to the traversing axis; and the plurality of fluid ports, the plurality of fluid ports fluidly connected to the body, wherein each fluid port has a port diameter, each fluid port has a port angle.

3. The method of claim 1, wherein the supercritical fluid is water.

4. The method of claim 1, wherein the port alignment is selected from the group consisting of straight in-line, straight across, staggered across, spiral pattern and combinations thereof.

5. The method of claim 2, wherein the port angle is between 1 deg. and 90 deg.

6. The method of claim 2, wherein the sequential mixer further comprises a flow restrictor installed between each of the plurality of fluid ports.

7. The method of claim 6, wherein the flow restrictor is an orifice place with an orifice.

8. The method of claim 1, wherein the mixed temperature is between 150° C. and 400° C.

9. A sequential mixer for mixing a heated hydrocarbon stream and a supercritical fluid to produce an intimately mixed stream upstream of a supercritical reactor, the sequential mixer comprising:

a body, the body having a body length and a body diameter;

a hydrocarbon inlet, the hydrocarbon inlet physically connected to the body, the hydrocarbon inlet having an inlet diameter, wherein the heated hydrocarbon stream is introduced to the sequential mixer through the hydrocarbon inlet;

a mixed stream outlet, the mixed stream outlet physically connected to the body and fluidly connected to the supercritical reactor, the mixed stream outlet having an outlet diameter;

a traversing axis, the traversing axis extending through the center of the body from the hydrocarbon inlet to the mixed stream outlet;

a cross-sectional axis, the cross-sectional axis perpendicular to the traversing axis; and a plurality of fluid ports, the plurality of fluid ports physically connected to the body, wherein the plurality of fluid ports are arranged in a port alignment arrayed along the traversing axis, wherein each fluid port of the plurality of fluid ports has a port diameter, wherein each fluid port has a port angle, wherein the supercritical fluid is injected through the plurality of fluid ports.

10. The sequential mixer of claim 9, wherein the port alignment is selected from the group consisting of straight in-line, straight across, staggered across, spiral pattern and combinations thereof.

11. The sequential mixer of claim 9, wherein the port angle is between 1 deg. and 90 deg.

12. The sequential mixer of claim 9, wherein the sequential mixer further comprises a flow restrictor installed between each of the plurality of fluid ports.

13. The sequential mixer of claim 10, wherein the flow restrictor is an orifice plate with an orifice.

14. The sequential mixer of claim 9, wherein the mixed temperature is between 150° C. and 400° C.

15. The sequential mixer of claim 9, wherein the body diameter is greater than 0.1 inch.

16. The sequential mixer of claim 9, wherein the body length is greater than 0.5 inches.

17. The sequential mixer of claim 9, wherein the inlet diameter is larger than the port diameter.

18. The sequential mixer of claim 9, wherein a mixing chamber is positioned between two of the plurality of fluid ports.

19. A system for producing an upgraded hydrocarbon stream, the system comprising:

a sequential mixer, the sequential mixer configured to receive a heated hydrocarbon stream through a hydrocarbon inlet and configured to receive a supercritical fluid through a plurality of fluid ports to produce an intimately mixed stream, the intimately mixed stream comprising hydrocarbons and supercritical fluid, wherein the sequential mixer comprises:

a body, the body having a body length and a body diameter, wherein the heated hydrocarbon stream and the supercritical fluid mix in the body to produce the intimately mixed stream;

the hydrocarbon inlet physically connected to the body, the hydrocarbon inlet having an inlet diameter, a mixed stream outlet, the mixed stream outlet physically connected to the body and fluidly connected to the supercritical reactor, the mixed stream outlet having an outlet diameter, a traversing axis, the traversing axis extending through the center of the body from the hydrocarbon inlet to the mixed stream outlet, and a plurality of fluid ports, the plurality of fluid ports physically connected to the body, wherein the plurality of fluid ports are arranged in a port alignment arrayed along the traversing axis, wherein each fluid port of the plurality of fluid ports has a port diameter, wherein each fluid port has a port angle, wherein the supercritical fluid is injected through the plurality of fluid ports;

a supercritical reactor, the supercritical reactor fluidly connected to the sequential mixer, the supercritical reactor configured to produce an effluent stream;

a product exchanger, the product exchanger fluidly connected to the supercritical reactor, the product exchanger configured to cool the effluent stream to a temperature below the critical temperature of water to produce a cooled effluent;

a pressure reducer, the pressure reducer fluid connected to the product exchanger, the pressure reducer configured to reduce the pressure of the cooled effluent to a pressure below the critical pressure of water to produce a product stream;

a gas-liquid product separator, the gas-liquid product separator fluidly connected to the pressure reducer, the gas-liquid product separator configured to separate the product stream to produce a vapor phase product and a liquid phase product;

a liquid product separator, the liquid product separator fluid connected to the gas-liquid separator, the liquid product separator configured to produce the upgraded hydrocarbon stream and a recovered fluid stream, wherein the upgraded hydrocarbon stream.

* * * * *